United States Patent [19]

Ohnishi et al.

[11] 4,395,766

[45] Jul. 26, 1983

[54] LASER TYPE RECORDING DEVICE

[75] Inventors: Masahiro Ohnishi; Shigenori Oosaka; Hiroshi Oono, all of Asaka, Japan

[73] Assignee: Fuji Photo Film Co., Ltd., Kanagawa, Japan

[21] Appl. No.: 214,815

[22] Filed: Dec. 9, 1980

[30] Foreign Application Priority Data

Dec. 25, 1979 [JP] Japan ................. 54-168565

[51] Int. Cl.³ ............................................. H04N 1/22
[52] U.S. Cl. ...................................... 369/47; 358/298; 358/302; 369/122
[58] Field of Search ............... 358/296, 297, 298, 299, 358/302, 283, 285; 369/47, 122, 121; 372/7, 8, 26, 27

[56] References Cited

U.S. PATENT DOCUMENTS

| | | | |
|---|---|---|---|
| 3,374,311 | 3/1968 | Hell | 358/297 |
| 3,656,175 | 4/1972 | Carlson et al. | 358/297 X |
| 3,920,951 | 11/1975 | Chovan et al. | 358/299 X |
| 3,988,742 | 10/1976 | Meier et al. | 358/302 X |
| 4,001,492 | 1/1977 | Suzuki et al. | 358/298 X |
| 4,106,061 | 8/1978 | Burnett | 358/296 |

FOREIGN PATENT DOCUMENTS 2305512  8/1973  Fed. Rep. of Germany ...... 358/283

*Primary Examiner*—Bernard Konick
*Assistant Examiner*—Donald McElheny, Jr.
*Attorney, Agent, or Firm*—Sughrue, Mion, Zinn, Macpeak & Seas

[57] ABSTRACT

A laser recording device adapted for use in a facsimile system in which a semiconductor laser is activated by a series of pulses the number of which is produced in accordance with an input signal. The input signal is sampled with a sampling pulse signal whereas the pulses applied to the semiconductor laser are produced at a frequency which is at least two orders of magnitude greater than the frequency of the pulses used to sample the input signal. The input signal is digitized and used to address a read-only memory which outputs a number of pulses in dependence upon the amplitude of the input signal. The output number of pulses may be logarithmically related to the magnitude of the input signal.

6 Claims, 8 Drawing Figures

LASER TYPE RECORDING DEVICE

BACKGROUND OF THE INVENTION

The present invention relates to a recording device using a semiconductor laser in which an image such as a picture having halftones is reproduced with several tens of levels of halftones.

In order to record a halftone image, a laser beam may be intensity-modulated according (1) a first technique using an ultrasonic light modulator, (2) a second technique in which the discharge current of a gas laser is varied, or (3) a third technique in which the current flow to a semiconductor laser is varied.

The first technique is disadvantageous in that the provision of an expensive ultrasonic light modulator is necessary and it is necessary to provide a mechanism for making fine position adjustments of the modulator so that the modulator is operated in conformance with a Bragg angle with the result that the device according to the first technique has a high manufacturing cost and intricate construction.

The second technique is also disadvantageous in that, for gas laser discharge current modulation, the modulation frequency must be in a low frequency range of several hundred Hz and that the variations of the discharge current reduce the service life of the laser tube.

The third technique has a drawback that, as the semiconductor laser has an optical output-current characteristic as shown in FIG. 1, the optical output changes greatly merely by slightly changing the current. Accordingly, it is considerably difficult to modulate the optical output through more than several tens of levels by changing the current.

An object of this invention is then to provide a laser type recording device which can record a halftone image of more than several tens of levels.

More specifically, it is an object of the invention to provide a laser type recording device having several tens or several hundreds of light modulation levels.

A further object of the invention is to provide a laser type recording device which is capable of recording an image rich in halftones.

SUMMARY OF THE INVENTION

In accordance with these and other objects of the invention, the laser type recording device according to the invention employs a semiconductor laser and can provide several tens or several hundreds of modulation levels.

A specific feature of the laser type recording device according to the invention is that an input signal is sampled with a sampling pulse signal, a high frequency pulse is generated whose frequency is higher by at least two orders of magnitude than the frequency of the sampling pulse, and the high frequency pulse signal is applied to a semiconductor laser with the number of high frequency pulses being controlled according to the input signal.

The sampling pulse signal samples an input video signal at predetermined time intervals. The frequency of the sampling pulse signal can be selected as desired. However, in order to reproduce the image with a high resolution, it is preferable that the frequency of the sampling pulse signal be slightly higher than the highest frequency components of the video signal. The frequency of the high frequency pulse signal is higher than that of the sampling pulse signal. Preferably, the high frequency pulse signal has a frequency several hundred to several ten-thousand times the frequency of the sampling pulse signal. These two pulse signals may be generated separately, or the sampling pulse signal can be obtained by frequency dividing the high frequency pulse signal to frequency division.

The device is so designed that it is capable not only of responding linearly to the input signal but also can take into account logarithmic conversion properties of the signal and recording material characteristics and input and output characteristics stored in advance.

The input signal is a video signal which may be either an analog signal or a digital signal.

DESCRIPTION OF THE PREFERRED EMBODIMENTS

Figure 2:
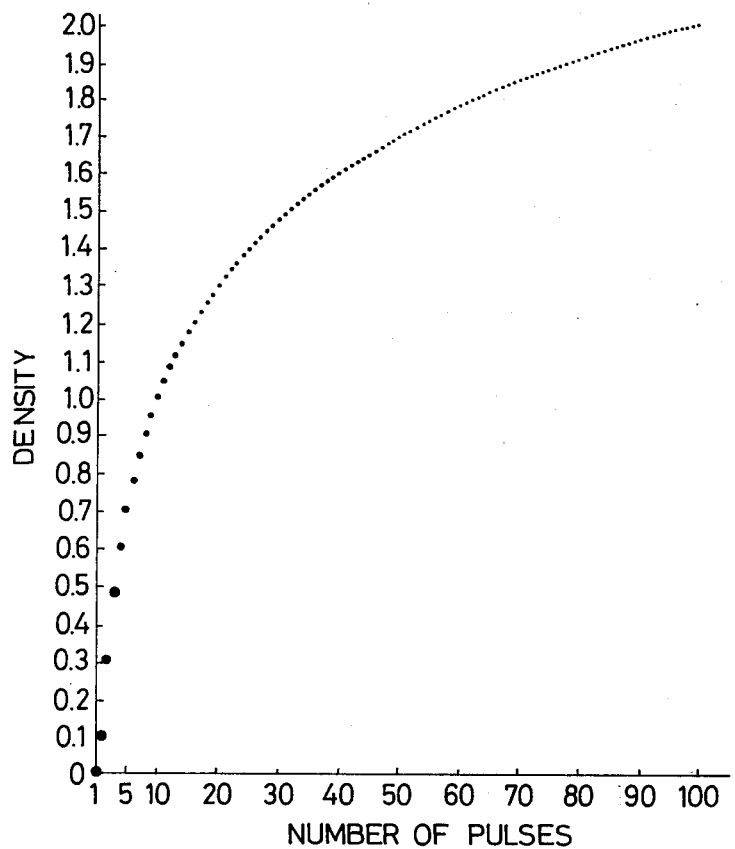
FIG. 2 is a graphical representation indicating the relationships between the number of pulses applied to a semiconductor laser and the density of a recorded image.

The relation between the number of pulses and the density of a recorded image in the case where an image is recorded by the semiconductor laser which is controlled according to the number of high frequency pulses will be described with reference to FIG. 2. FIG. 2 shows a characteristic curve which is obtained for a $\gamma$ (the gradient of the characteristic curve) value of a recording material of 1 and for a highest density of 2.0. If brightness modulation is carried out with 100 sampling pulses, a density difference $\Delta D$ changes by as much as 0.2 for each one or two pulses in low density ranges while in high density ranges the density difference $\Delta D$ is only about 0.1 for 20 pulses. That is, in this case, tones of low density are reproduced considerably roughly. In order to reproduce the tones of higher density levels, the sampling must be carried out with at least 1,000 pulses.

As is apparent from the above description, in order to reproduce tones in ten density levels at equal intervals, it is necessary to carry out modulation with the number of pulses being in the hundreds and in order to reproduce the tones in more density levels the number of pulses must be in the thousands. If pulses modulation is carried out with only 10 pulses with equal density intervals $\Delta D$, the number of density levels reproduced is only two or three.

In view of the foregoing, in accordance with the invention, the output of a semiconductor laser is pulse modulated with a high frequency pulse signal taking into account the operative properties of the semiconductor laser so that its output can be subjected to high speed modulation. The number of high frequency pulses whose frequency is higher by two or three orders of magnitude than the highest video frequency is controlled so as to subject the output of the semiconductor laser to brightness modulation thereby to record halftones of an image on the recording sheet.

Figure 3:
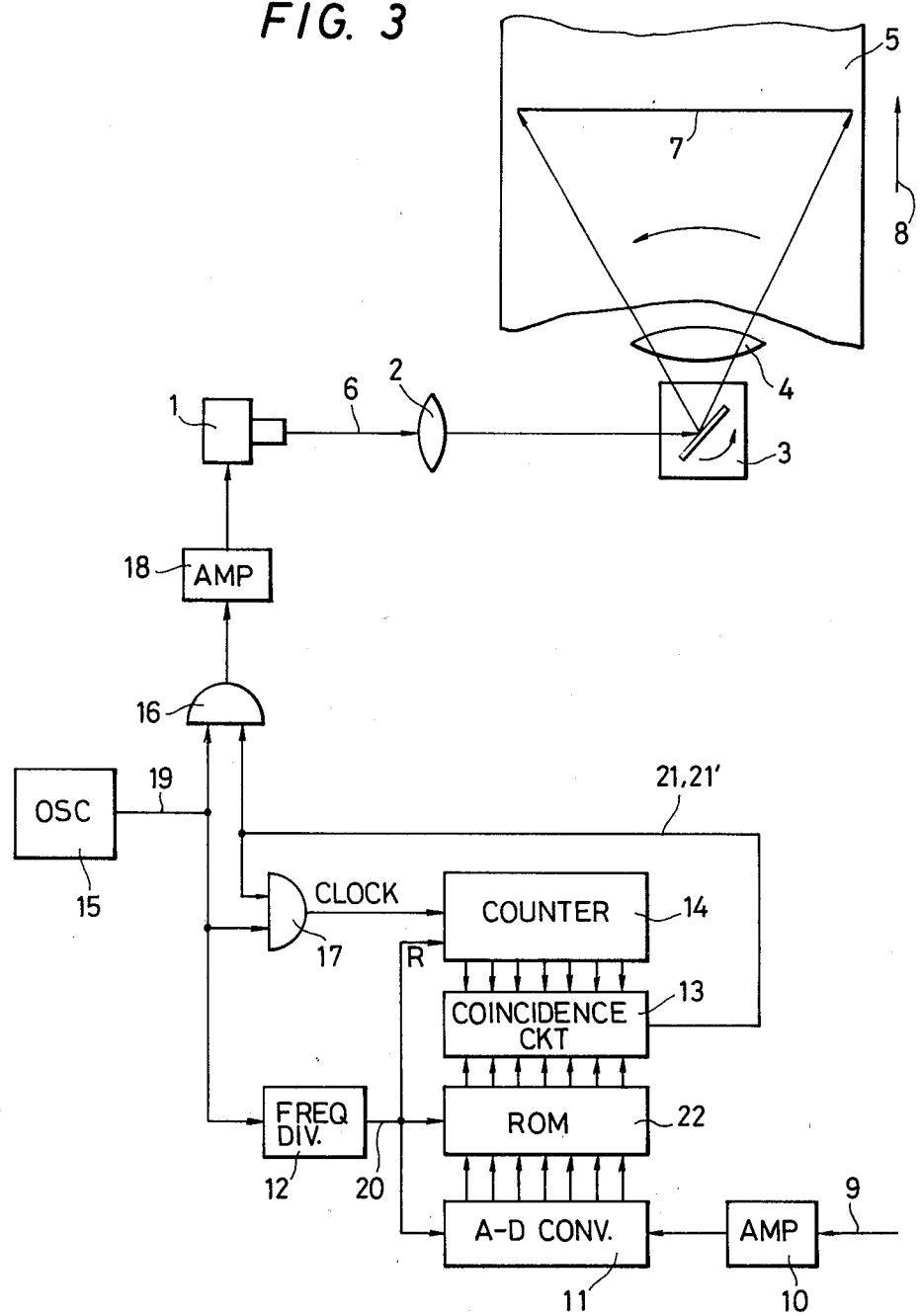
FIG. 3 is a block diagram showing a preferred embodiment of a laser type recording device according to the invention.
Figure 4A:
FIGS. 4A–4D taken together are a timing chart for a description of the signals in the device according to the invention.
Figure 4B:
Figure 4C:
Figure 4D:

FIG. 3 is a block diagram showing a preferred embodiment of a laser type recording device constructed according to the invention. In FIG. 3, reference numeral 1 designates a semiconductor laser, 2 a beam shaping lens, 3 a deflector, 4 a focusing lens, and 5 a recording sheet. The recording sheet 5 is preferably a silver salt photographic paper or an electronic photographic paper which is capable of recording halftone images and which is sensitive to the red or infrared wavelength of a semiconductor laser beam. A semiconductor laser beam 6, which is current-pulse-modulated, is collimated by the beam shaping lens 2, deflected by the deflector 3, and focused into a spot having a predetermined size by the focusing lens 4. Accordingly, the laser beam spot scans the recording sheet 5 in a main scanning direction, hereinafter referred to as "main-scanning" when applicable. Auxiliary scanning is carried out by moving the recording sheet 5 in the direction of the arrow 8. In the preferred embodiment here described, the deflector 3 is a galvanometer.

The semiconductor laser modulation, which is one of the specific features of the invention, will be described. In accordance with the invention, pulse modulation is achieved with high frequencies up to several hundreds of MHz, by the utilization of high frequency pulse modulation and the quantity of light emitted is controlled according to the number of pulses. For instance in the case where the highest video frequency is 1 KHz, a video signal sampled with 1 KHz is pulse-modulated at 1 MHz. If, in this operation, the number of pulses thereof is controlled, modulation can be carried out with the number of pulses ranging from zero to 1,000 according to the magnitude of the video signal to achieve halftone modulation.

The pulse modulation operation described above will be described with reference to FIG. 3 in more detail. An input video signal is amplified to a predetermined level by a waveform shaping amplifier 10. The video signal may, for instance, be a received facsimile signal. A high frequency pulses signal outputted by a high frequency oscillator 15 is subjected to frequency divider 12 provides a sampling pulse signal 20. It is preferable that the frequency of the sampling pulse signal 20 be slightly higher than the highest video frequency component of the video signal 9. An analog-to-digital (AD) converter 11 samples the output signal of the amplifier 10 clocked by the falling edges of the sampling pulse signed 20. The output 20 is converted into a digital value and the digital value is held until the falling edge of the next sampling pulse occurs. The signal thus converted is applied to a digital value contrast circuit 22. The digital value contrast circuit 22 converts the digital signal into a digital value which is the number of pulses indicated by the graph of FIG. 2. More specifically, the digital value contrast circuit 22 outputs a digital value "1" in order to reproduce a density of 0.1, a digital value "3" to reproduce a density of 0.5, a digital value "10" to reproduce a density of 1.0, a digital value "30" to reproduce a density of 1.5, a digital value "100" to reproduce a density of 2.0, and so forth, in the case of FIG. 2. FIG. 2 corresponds to the case where the value of $\gamma$ for the recording material chosen is 1. It goes without saying that different curves are provided for different values of $\gamma$, that is, different contrast values are provided for different recording materials.

The digital value contrast circuit 22 is composed of a read-only memory. The bits of the AD conversion value of an input signal are inputted, as an address signal, to the digital value contrast circuit 22. A value corresponding to a contrast pulse number is stored in the corresponding address. Thus, the number of pulses corresponding to the input address signal is outputted by the circuit 22 for every sampling pulse. In this embodiment, the output signal of a facsimile transmitter is expressed as a signal corresponding to a density so that a logarithmically converted signal is provided. In the case of signals other than logarithmically converted signals, the digital value contrast circuit may be programmed to take into account the characteristics of the particular input signal provided.

The frequency of the high frequency pulse signal 19 outputted by the high frequency oscillator 15 is 100 to 1,000 times as high as that of the sampling pulse signal 20. The high frequency pulse signal 19 is applied through an AND gate 17 to the clock input of a counter 14. The content of the counter 14 is cleared (reset) by the sampling pulse 20 from the frequency divider 12.

The outputs of the counter 14 and of the digital value contrast circuit 22 are applied to a coincidence circuit 13 where they are compared with each other. When the two are identical, the coincidence circuit 13 outputs a coincidence signal 21. The coincidence signal 21 is applied to the AND gate 17 to close the gate and hence to stop the passage of the high frequency pulse signal 19. The coincidence signal 21 is further applied to an AND gate 16 to close it. The output high frequency pulse signal 19 of the high frequency oscillator 15, after passing through the AND gate 16 before it is closed as described above, is applied through an amplifier 18 to the semiconductor laser 1.

The sampling pulse 20 is again applied to the AD converter 11 and the counter 14. As a result, the AD converter 11 converts the input signal into a digital value which is further converted into a corresponding digital value by the digital value contrast circuit. At the same time, the content of the counter 14 is cleared. If, in this case, the input signal is not zero, the coincidence circuit 13 outputs a non-coincidence signal 21' which is applied to the AND gates 16 and 17 to open the gates 16 and 17 so that the high frequency pulse signal 19 is applied to the amplifier 18 and the counter 14. Thus, the high frequency pulse 19 is applied through the amplifier 18 to the semiconductor laser 1 until the coincidence signal 21 is outputted by the coincidence circuit 13.

As the semiconductor laser is turned on and off to subject it to optical modulation, as described above, an image is recorded with several tens of density levels on the recording sheet.

The quantity of laser light in the case where current is applied to the semiconductor laser in response to the high frequency pulse signal as described above is smaller than that in the case where current is continuously applied to the semiconductor laser. For instance, if the duty ratio of the high frequency pulse is 1:1, the quantity of laser light is halved. However, no problem is caused in practical use if the duty ratio of the high frequency pulse, the laser beam scanning speed, and the laser beam output are suitably adjusted.

The signals present in the semiconductor laser type recording device described above will be illustrated with reference to FIGS. 4A–4D in which the horizontal axis represents time and the magnitudes of the various signals are plotted on the vertical axis. FIGS. 4A–4D show the high frequency pulse signal 19, the sampling pulse signal 20, the states of the AND gate 16, and the high frequency pulse signal applied to the semiconductor laser through the AND gate 16, respectively.

Figure 1:
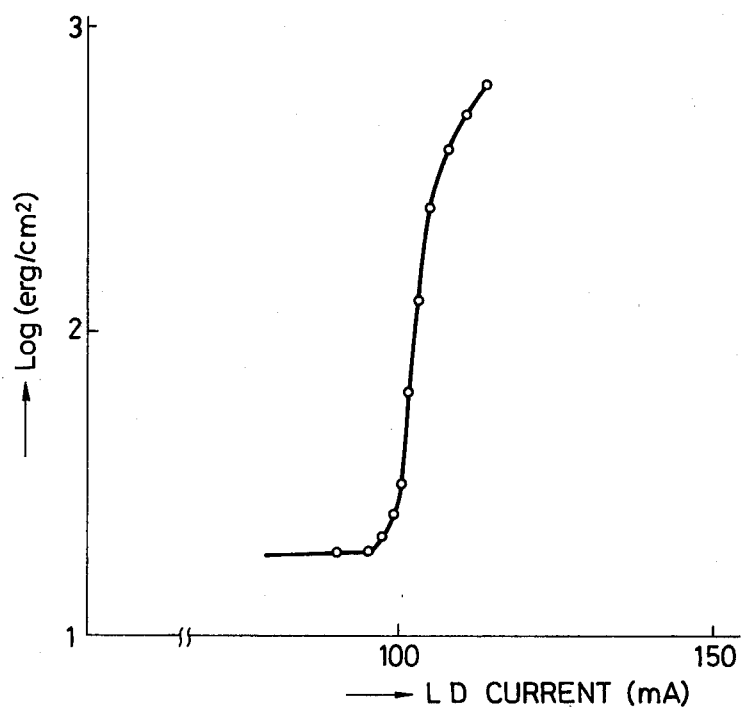
FIG. 1 is a graphical representation indicating the current to light emission characteristic of a semiconductor laser.

As is clear from the above description, in the laser type recording device of the invention, the semiconductor laser is subjected to pulse modulation with the applied pulses having a frequency higher by two to four orders of magnitudes than the highest video frequency components. Accordingly, the laser type recording device can stably provide more output levels than a conventional device of this type in which brightness modulation is carried out using the optical output-current characteristic of the laser as shown in FIG. 1.

Thus, according to the invention, the halftones of an image can be sufficiently recorded on a recording material, the halftones of an original image can be reproduced correctly, and also the halftones can be recorded stably.

Figure 5:
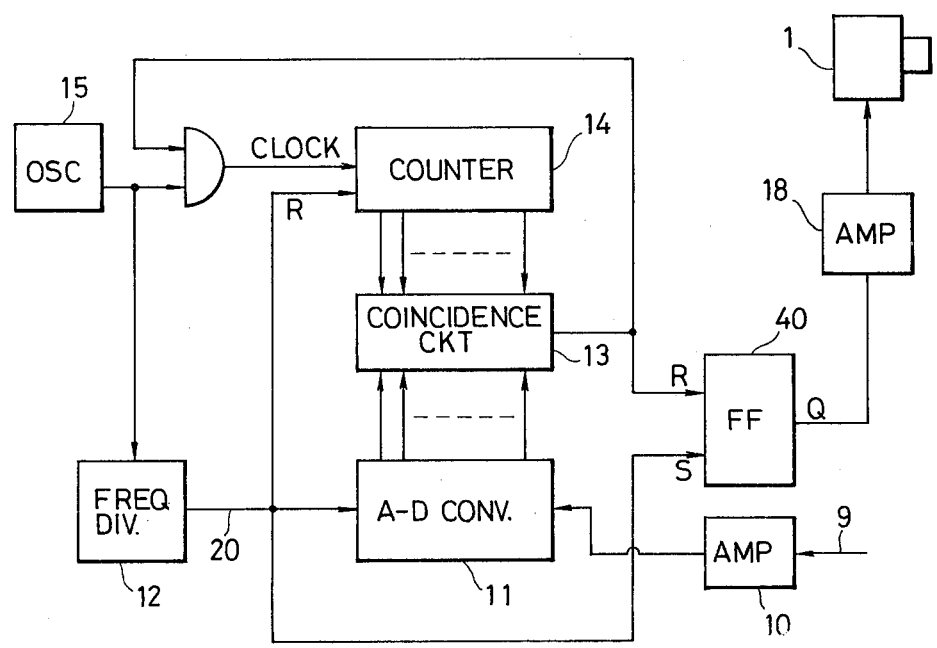
FIG. 5 is a block diagram showing another embodiment of a laser type recording device of the invention.

In the above-described preferred embodiment, control is effected in accordance with a pulse frequency. However, the output of the semiconductor laser can be controlled with a circuit shown in FIG. 5. In this circuit, a flip-flop circuit 40 is provided which is set by pulses of the sampling pulse signal and reset by the pulses of the coincidence pulse signal from the coincidence circuit 13 so that the output of the semiconductor laser is controlled by pulse width modulation. In FIGS. 5 and 3, like parts are designated by like reference numerals or characters.

What is claimed is:

1. A laser type recording device comprising: means for sampling an input signal with a sampling pulse signal; means for applying a high frequency pulse signal whose frequency is higher by at least two orders of magnitude than the frequency of said sampling pulse to a semiconductor laser; and means for controlling a number of pulses of said high frequency pulse signal applied to said semiconductor laser according to a magnitude of said sampled input signal.

2. A laser type recording device comprising: a semiconductor laser; means for scanning an output beam from said semiconductor laser onto a recording material; means for supplying an input signal; means for modulating said semiconductor laser, by applying a high frequency pulse signal whose frequency is higher by at least two orders of magnitude than a maximum frequency of said input signal to said semiconductor laser; and means for controlling said modulator means in response to a magnitude of said input signal, wherein the number of said pulses of said high frequency pulse signal applied to said semiconductor laser is determined in accordance with said magnitude of said input signal.

3. The laser type recording device of claim 2 wherein said control means controls said number of said pulses of said high frequency pulse signal applied to said semiconductor laser such that said number is logarithmically related to said amplitude of said input signal.

4. The laser type recording device of claim 2 wherein the frequency of the high frequency pulse signal is logarithmically related to said amplitude of said input signal.

5. A laser type recording device comprising: a semiconductor laser; means for scanning an output beam from said semiconductor laser onto a recording material; means for supplying an input signal; an oscillator for producing a first pulse signal having a frequency higher than the highest frequency components in said input signal; a frequency divider coupled to receive said first pulse signal, said frequency divider producing a second pulse signal, the frequency of said first pulse signal being at least two orders of magnitude greater than the frequency of said second pulse signal; analog-to-digital converter means for converting said input signal to digital values; a read-only memory, said read-only memory being coupled to be addressed by outputs of said analog-to-digital converter means, said read-only memory producing output digital values representing numbers of pulses in response to outputs of said analog-to-digital converter means; counter means, said second pulse signal being coupled to reset said counter means and to initiate operations of said analog-to-digital converter means; a coincidence circuit, said coincidence circuit having one set of inputs coupled to outputs of said read-only memory and a second set of inputs coupled to count outputs of said counter means; a first AND gate, a first input of said AND gate being coupled to receive said first pulse signal and a second input of said AND gate being coupled to an output of said coincidence circuit, an output of said AND gate being coupled to a clock input of said counter means; a second AND gate having a first input coupled to receive said first pulse signal and a second input coupled to receive said output signal from said coincidence circuit; and amplifier means for amplifying the output of said second AND gate, an output of said amplifier means being coupled to operate said semiconductor laser.

6. A laser type recording device comprising: a semiconductor laser; means for scanning an output beam from said semiconductor laser onto a recording material; means for supplying an input signal; an oscillator for producing a first pulse signal having a frequency higher than the frequency of the highest frequency components of said input signal; a frequency divider having an input coupled to receive said first pulse signal, said frequency divider producing a second pulse signal, the frequency of said first pulse signal being at least two orders of magnitude greater than the frequency of said second pulse signal; analog-to-digital converter means for converting said input signal to digital values, said analog-to-digital converter means operating in response to said second pulse signal; counter means, said counter means coupled to be reset by said second pulse signal; a coincidence circuit, said coincidence circuit means having a first set of inputs coupled to outputs of said analog-to-digital converter means and a second set of inputs coupled to outputs of said counter means; an AND gate, said AND gate having a first input coupled to receive said first pulse signal and a second input coupled to an output of said coincidence detecting means and an output coupled to a clock input of said counter means; flip-flop means having a set input coupled to receive said second pulse signal and a reset input coupled to said output of said coincidence circuit; and amplifier means having an input coupled to an output of said flip-flop means and and output coupled to said semiconductor laser.

* * * * *